3,213,142
SYNTHESIS OF STEROIDS
Frank L. Weisenborn, Somerset, N.J., assignor to Olin Mathieson Chemical Corporation, New York, N.Y., a corporation of Virginia
No Drawing. Original application Jan. 15, 1962, Ser. No. 166,353. Divided and this application May 28, 1963, Ser. No. 287,458
2 Claims. (Cl. 260—586)

This application is a division of my application, Serial No. 166,353, filed January 15, 1962.

This invention relates to the synthesis of new steroids, and, more particularly, has for its objects the provisions of new physiologically active steroids, intermediates therefor, and methods for preparing the same.

The final products of this invention can be represented by the formula

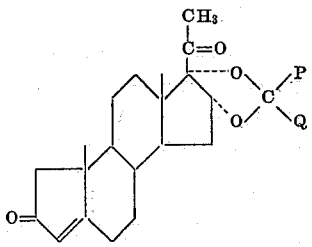

wherein P is hydrogen, lower alkyl, halo lower alkyl, monocyclic cycloalkyl, monocyclic cycloalkyl lower alkyl, monocyclic aryl, monocyclic aryl lower alkyl, monocyclic heterocylic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is monocyclic cycloalkyl or monocyclic heterocyclic.

These final products are prepared by the processes of this invention, via new intermediates of this invention. In the first step of the process, 16α-hydroxy-A-norprogesterone is dehydrated to yield a new intermediate of this invention, $\Delta^{3,16}$-A-norpregnadiene-2,20-dione of the formula

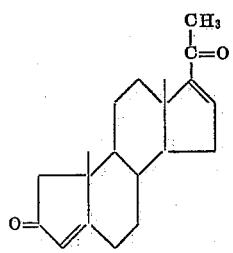

The dehydration is preferably accomplished by treatment of the 16α-hydroxy-A-norprogesterone with a dehydrating agent, such as aluminum tert-butoxide, at an elevated temperature, such as the reflux temperature of the solvent in which the steroid is dissolved.

The $\Delta^{3,16}$-A-norpregnadiene-2,20-dione is then converted to 16α,17α-dihydroxy-A-norprogesterone, a new intermediate of this invention of the formula

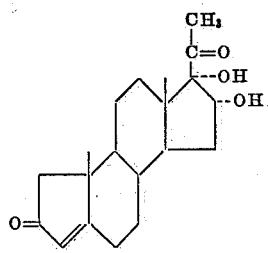

by treatment with osmium tetroxide. The reaction is preferably carried out in the presence of a base, such as an organic base, as exemplified by pyridine.

The 16α,17α-dihydroxy-A-norprogesterone is then converted to its acetal and ketal derivatives by treatment with an aldehyde or ketone of the formula:

wherein P and Q are as hereinbefore defined. The reaction is preferably conducted in the presence of a strong acid, such as perchloric acid.

Among the suitable aldehydes and ketones which may be used can be mentioned lower alkanals of at least two carbon atoms, such as paraldehyde, propanal and hexanal; di(lower alkyl)ketones, such as acetone, diethylketone, dibutylketone, methylethylketone, and methylisobutylketone; cycloalkananones, such as cyclobutanone, cyclopentanone, cyclohexanone, suberone, and cyclodexanone; cycloalkyl (lower alkanals), such as cyclopropylcarboxaldehyde, cyclobutylcarboxaldehyde, cyclopentylcarboxaldehyde, cyclohexylcarboxaldehyde, cycloheptylcarboxaldehyde, cyclooctylcarboxaldehyde, cyclopropylacetaldehyde, cyclobutylacetaldehyde, cyclopentylacetaldehyde, cyclohexylacetaldehyde, β-cyclopentylpropionaldehyde, γ-cyclohexylbutyraldehyde, and 3-cyclopropylcarproaldehyde; cycloalkyl (lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-pentyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopentyl cyclohexyl ketone, cyclopropylmethyl cyclopropyl ketone, 2-cyclobutylethyl cyclopropyl ketone, 3-cyclopentylmethyl cyclopentyl ketone, 5-cyclohexylhexyl cyclohexyl ketone, di(cyclopentylmethyl) ketone, cyclohexylmethyl cyclopentyl ketone, and di(4-cyclohexylpentyl) ketone; cycloalkyl monocyclic aromatic ketones, such as cyclopropyl phenyl ketone, cyclohexyl p-chlorophenyl ketone, cyclopentyl o-methoxyphenyl ketone, cyclopentyl o,p-dihydroxyphenyl ketone, cyclohexyl m-tolyl ketone, cyclopropyl-p-ethylphenyl ketone cyclopropyl p-nitrophenyl ketone, and cyclohexyl p-acetamidophenyl ketone; cycloalkyl (lower alkyl) monocyclic aromatic ketones, such as cyclopentylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl (lower alkyl) monocyclic aromatic (lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone, cycloalkyl (lower alkyl)monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl) ketones, such as cyclopentyl thenyl ketone, cyclohexyl furfuryl ketone and cyclopropyl 2-piperdinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g., p-chlorobenzaldehyde and p-fluorobenzaldehyde), lower alkoxybenzaldehydes (e.g., o-anisaldehyde), di(lower alkoxy)-benzaldehydes (e.g., veratraldehyde), hydroxybenzaldehydes (e.g., salicyladehyde), dihydroxybenzaldehydes (e.g. resorcyaldehyde), lower alkyl benzaldehydes (e.g., m-tolualdehyde and p-ethylbenzaldehyde), di(lower alkyl)benzaldehydes (e.g. o,p-dimethylbenzaldehyde), nitrobenzaldehydes acylamidobenzaldehydes (e.g. N-acetylanthranilaldehyde), and cyanobenzaldehydes; monocyclic carboxylic aromatic lower alkanals, such as phenylacetaldehyde, α-phenylpropionaldehyde, β-phenylpropionaldehyde, γ-phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophen carbonals, and halo, lower alkoxy, hydroxy, lower alkyl, nitro and cyano derivatives thereof; monocyclic heterocyclic lower alkanals; monocyclic carbocyclic aromatic ketones, such as acetophenone, α,α,α-trifluoroacetophenone, propiophenone, butyrophenone, valerophenone, isocaprophenone, halophenyl lower alkyl ketones (e.g. p-chloroacetophenone and p-chloropropionphenone), (lower alkoxy) phenyl lower alkyl ketones (e.g. p-anisyl methyl ketone), di(lower alkoxy)phenyl lower alkyl ketones, hydroxy-phenyl lower alkyl ketones, dihydroxyphenyl lower alkyl ketones (e.g. resacetophenone), (lower alkyl) phenyl lower alkyl ketones (e.g. methyl p-tolyl ketone), di(lower alkyl)-phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetylthiophene and alloxan; and monocyclic heterocyclic lower alkanones.

The final products of this invention and the new intermediates utilized in the preparation thereof are physiologically active substance which possess antiandrogen activity and hence may be used in the treatment of hyperandrogenic acne (the acne condition resulting from the overabundance of an androgen, such as testosterone). For this purpose, they are administered either topically or systemically (e.g., subcutaneously) with the dosage determined by the activity of the specific compound employed.

The following examples illustrate the preparation of the compounds of this invention (all temperatures being in centigrade):

EXAMPLE 1

$\Delta^{3,16}$-A-norpregnadiene-2,20-dione

A solution of 352 mg. of 16α-hydroxy-A-norprogesterone in 175 ml. of toluene containing 700 mg. of aluminum t-butoxide is heated under reflux in a nitrogen atmosphere for two hours. The resulting solution is diluted with ether and washed with dilute hydrochloric acid, water, saturated sodium chloride solution, dried over magnesium sulfate and concentrated, leaving about 330 mg. of crude product. Recrystallization of this material from ethyl acetate-hexane yields about 305 mg. of colorless $\Delta^{3,16}$-A-norpregnadiene-2,20-dione, M.P. about 176–177°; $[\alpha]_D$ +55° (chloroform):

$$\lambda_{max.}^{EtOH} \ 235 \ m\mu \ (\epsilon = 26{,}000)$$

*Analysis.*—Calcd. for $C_{20}H_{26}O_2$: C, 80.49; H, 8.78. Found: C, 80.30; H, 8.69.

EXAMPLE 2

16α,17α-dihydroxy-A-norprogesterone

A solution of 60 mg. of $\Delta^{3,16}$-A-norpregnadiene-2,20-dione in 2.5 ml. of benzene containing 0.2 ml. of pyridine is treated dropwise with a solution of 56 mg. of osmium tetroxide in 2.5 ml. of benzene. The reaction mixture is stirred at room temperature for 45 minutes and then diluted with a solution of 400 mg. of sodium sulfite and 400 mg. of potassium bicarbonate in 5 ml. of water, followed by 5 ml. of methanol. Stirring is continued for three hours, the precipitate is then centrifuged off and washed with chloroform. The combined supernatant phase are diluted with water and extracted with chloroform. The chloroform extracted is washed with water, saturated sodium chloride solution, dried over magnesium sulfate and concentrated to dryness leaving about 61 mg. of crystalline residue. Recrystallization from ethyl acetate-hexane yields about 52 mg. of pure 16α,17α-dihydroxy-A-norprogesterone, M.P. about 178–180°. $[\alpha]_D$ —24° (chloroform):

$$\lambda_{max.}^{EtOH} \ 233 \ m\mu \ (\epsilon = 15{,}000)$$

*Analysis.*—Calcd. for $C_{20}H_{28}O_4$: C, 72.26; H, 8.49. Found: 72.15; H, 8.53.

EXAMPLE 3

Acetonide of 16α,17α-dihydroxy-A-norprogesterone

A solution of 30 mg. of 16α,17α-dihydroxy-A-norprogesterone in 5 ml. of acetone containing 0.005 ml. of 70% perchloric acid is allowed to stand at room temperature for one hour. The solution is than made basic by addition of 5% sodium bicarbonate solution, diluted further with water and extracted twice with chloroform. The combined chloroform extracts are washed with water, saturated sodium chloride solution, dried over magnesium sulfate, and concentrated to dryness leaving about 31 mg. of crystalline product. Recrystallization from acetone-hexane yields about 28 mg. of acetonide, M.P. about 187–188°; $[\alpha]_D$—21 (chloroform).

*Anaylsis.*—Calcd. for $C_{23}H_{32}O_4$: C, 74.16; H, 8.66. Found: C, 74.23; H, 9.01.

EXAMPLE 4

16α,17α-Dihydroxy-A-norprogesterone acetophenonide

Following the procedure of Example 3, but substituting an equivalent amount of acetophenone for the acetone, 16α-17α-dihydroxy-A-norprogesterone acetophenonide is obtained.

EXAMPLE 5

Dicyclopropyl ketone derivative of 16α,17α-dihydroxy-A-norprogesterone

Following the procedure of Example 3, but substituting an equivalent amount of dicyclopropyl ketone for the acetone, the dicyclopropyl ketone derivative of 16α-17α-dihydroxy-A-norprogesterone is obtained.

EXAMPLE 6

Chloral derivative of 16α,17α-dihydroxy-A-norprogesterone

Following the procedure of Example 3, but substituting an equivalent amount of chloral for the acetone, the chloral derivative of 16α,17α-dihydroxy-A-norprogesterone is obtained.

Similarly, the methyl isobutyl ketone derivative, the cyclopropyl phenyl ketone derivative, the cyclohexyl methyl ketone derivative, the 1,1,1-trifluoroacetonide derivative, the heptafluorobutanal derivative, the p-chloroacetophenone derivative, the p-nitroacetophenone derivative, the benzaldehyde derivative, the furfural derivative, the benzophonone derivative, and the 2-acetylfuran derivative of 16α,17α-dihydroxy-A-noprogesterone are obtained when methyl isobutyl ketone, cyclopropyl phenyl ketone, cyclohexyl methyl ketone, 1,1,1-trifluoroacetone, heptafluorobutanal, p-chloroacetophenone, p-nitro acetophenone, benzaldehyde, furfural, benzophenone and 2-acetylfuran, respectively, are substituted for acetone in the procedure of Example 3.

The invention may be variously otherwise embodied within the scope of the appended claims.

What is claimed is:
1. 16α,17α-dihydroxy-A-norprogesterone.
2. $\Delta^{3,16}$-A-norpregnadiene-2,20-dione.

References Cited by the Examiner

UNITED STATES PATENTS

| | | | |
|---|---|---|---|
| 2,838,569 | 6/58 | Ralls et al. | 260—586 |
| 2,972,623 | 2/61 | Johns | 260—586 |
| 3,008,958 | 11/61 | Fried et al. | 260—397 |
| 3,027,384 | 3/62 | Diassi | 260—397 |

FOREIGN PATENTS 556,028   4/58   Canada.

OTHER REFERENCES

Fieser et al.: "Steroids," pp. 586–599 (1959).

LEON ZITVER, *Primary Examiner.*